United States Patent [19]

Morishita

[11] 4,401,937
[45] Aug. 30, 1983

[54] CONTROL DEVICE FOR BATTERY CHARGING AC GENERATOR

[75] Inventor: Mitsuharu Morishita, Himeji, Japan

[73] Assignee: Mitsubishi Denki Kabushiki Kaisha, Tokyo, Japan

[21] Appl. No.: 192,594

[22] Filed: Sep. 30, 1980

Related U.S. Application Data

[63] Continuation of Ser. No. 954,176, Oct. 24, 1978, abandoned.

[30] Foreign Application Priority Data

Nov. 2, 1977 [JP] Japan .................. 52/147876

[51] Int. Cl.³ .................. H02J 7/10; H02P 9/10
[52] U.S. Cl. .................. 322/28; 320/64; 322/72; 361/18; 361/21
[58] Field of Search .................. 320/61, 64; 322/28, 322/72, 73; 323/279; 361/18, 20, 21

[56] References Cited

U.S. PATENT DOCUMENTS

| 3,100,863 | 8/1963 | McCullough | 323/279 |
|---|---|---|---|
| 3,405,319 | 10/1968 | Barringer | 323/279 X |
| 3,534,249 | 10/1970 | Neill et al. | 323/279 X |
| 3,596,170 | 7/1971 | Moriyasu et al. | 323/279 |
| 3,723,817 | 3/1973 | Leonard et al. | 322/28 X |
| 3,746,962 | 7/1973 | Wright | 320/61 |
| 3,835,367 | 9/1974 | Wiley | 322/28 |
| 3,942,096 | 3/1976 | Itoh et al. | 322/28 |

Primary Examiner—A. D. Pellinen
Attorney, Agent, or Firm—Hall and Houghton

[57] ABSTRACT

An output transistor is serially connected to a field coil in a battery charging AC generator to break and make a field current through it under the control of a control transistor to adjust a rectified voltage from the generator to a predetermined magnitude. Another transistor is connected to the output transistor to respond to a collector-to-emitter voltage of the latter in excess of a predetermined magnitude as sensed by it to turn the output transistor off.

10 Claims, 6 Drawing Figures ic diode 300 connected at the cathode elec-
CONTROL DEVICE FOR BATTERY CHARGING AC GENERATOR This application is a continuation of application Ser. No. 954,176, which is now abandoned.

BACKGROUND OF THE INVENTION

This invention relates to a control device for controlling a battery charging AC generator driven by an internal combustion engine, and more particularly to a current limiting circuit disposed in a voltage regulator equipped with semiconductor devices.

When the storage battery is charged by AC generators driven by associated internal combustion engines, the AC output voltage therefrom is generally full-wave rectified and then controlled to a predetermined magnitude by a voltage regulator for stopping and causing the flow of a field current through the field coil thereof. Conventional voltage regulators have been comprised of the output transistor being serially connected to the field coil and subsequently connected to the storage battery, and the control transistor being responsive to the output voltage from an associated AC generator in excess of a predetermined magnitude so as to be conducting to thereby place the output transistor in its nonconducting state to break the field current. On the other hand, with the output voltage from the generator less than the predetermined magnitude, the control transistor is held in its nonconducting state to thereby place the output transistor in its conducting state to permit a flow of field current through the field coil.

Voltage regulators of the type as above described have disadvantages in that, upon the occurrence of an interphase shortcircuit in the field coil, a current flowing through the output transistor has a magnitude much higher than a permissible magnitude of the field current and a collector-to-emitter voltage thereof is also high resulting in the instantaneous breakdown of the output transistor because of a high power loss thereof.

SUMMARY OF THE INVENTION

Accordingly, it is an object of the present invention to provide a new and improved control device for a battery charging AC generator including a voltage regulator which is prevented from breaking down due to a secondary fault resulting from an interphase or a complete shortcircuit occurring in a field coil of an AC generator being operated.

It is another object of the present invention to provide a new and improved control device for a battery charging AC generator including a voltage regulator prevented from breaking down due to the shortcircuit of one with the other end of a field coil of an AC generator resulting from a shortcircuit which developed on associated leads or from erroneous wiring effected during the assembling.

The present invention provides a control device for controlling a battery charging AC generator, comprising, in combination, an AC generator including a field coil, a full-wave rectifier means for full-wave rectifing an AC output voltage from the AC generator, a storage battery charged with a rectified output voltage from the AC generator, an output transistor serially connected to the field coil to break and make a field current flowing through the field coil to thereby be able to control the output voltage from the AC generator to a predetermined magnitude, a control transistor for controlling the turn-off and turn-on of the output transistor, and a current limiting transistor connected to the output transistor to sense a collector-to-emitter voltage of the output transistor during the nonconduction of the control transistor, the current limiting transistor responding to the sensed voltage reaching a predetermined magnitude so as to be conducting to place the output transistor in its nonconductive off state.

BRIEF DESCRIPTION OF THE DRAWINGS

The present invention will become more readily apparent from the following detailed description taken in conjunction with the accompanying drawings in which.

Throughout the drawing figures like reference numerals designate the identical or corresponding components.

DESCRIPTION OF THE PREFERRED EMBODIMENTS

Figure 1:
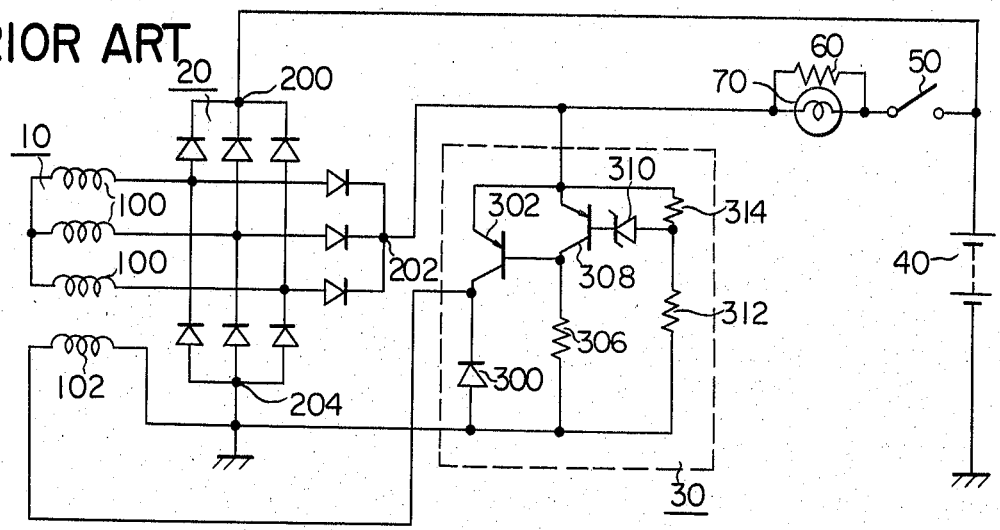
FIG. 1 is a circuit diagram of a control device for controlling a battery charging AC generator constructed in accordance with the principles of the prior art.

Referring now to FIG. 1 of the drawing, there is illustrated a conventional control device for controlling an AC generator for charging a storage battery. The arrangement illustrated comprises an AC generator generally designated by the reference numeral 10 and including an armature coil 100 connected in a three-phase star connection and a field coil 102, and a three-phase full-wave rectifier bridge generally designated by the reference numeral 20 connected to the armature coil 100 to full-wave rectify an AC output from the AC generator 10. The AC generator 10 is equipped on a vehicle (not shown) and driven by an internal combustion engine (not shown) also equipped on the vehicle, and the three-phase full-wave rectifier bridge 20 includes a first, a second and a third rectified output terminal 200, 202 and 204 respectively to produce a first and a second rectified voltage across the first and third output terminals and across the second and third out terminals respectively. The third output terminal 204 is connected to ground.

The field coil 102 of the generator 10 and the output terminals 202 and 204 are connected to a voltage regulator generally designated by the reference numeral 30 and operative to control a rectified output voltage from the generator 10 to a predetermined magnitude. More specifically, the voltage regulator 30 includes a semiconductor diode 300 connected at the cathode electrode to one end of the field coil 102 of the AC generator 10 and at the anode electrode to both the third or grounded output terminal 204 of the full-wave rectifier bridge and the other end of the field coil 102 to absorb surges and connected to a PNP output transistor 302.

The transistor 302 includes an emitter electrode connected to the second output terminal 202 of the full-wave rectifier bridge 20, a collector electrode connected to both the other end of the field coil 102 of the generator 10 and the cathode electrode of the diode 300 and a base electrode connected to the third output terminal of the full-wave rectifier 20 through a base resistor 306. Thus, the output transistor 302 is serially connected to the field coil 102 and serves as a switching element for breaking and making a field current through the field coil 102. The base electrode of the output transistor 302 is also connected to a collector electrode of a PNP control transistor 308 including an emitter electrode connected to both the emitter of the transistor 302 and the second output terminal 202 of the full-wave rectifier bridge 20.

The control transistor 308 is operative to control the turn-on and turn-off of the transistor 302 and is connected at the base electrode to a cathode electrode of a Zener diode 310. The Zener diode 310 includes an anode electrode connected to the junction of resistors 312 and 314 forming a voltage divider connected across the second and third output terminals 202 and 204 of the full-wave rectifier bridge 20. The Zener diode 310 is operative to sense the output from the generator 10 and is put in its conducting state upon the output voltage from the generator 10 reaching a predetermined magnitude or more.

The first output terminal 200 of the full-wave rectifier bridge 20 is connected to a positive side of a storage battery 40 including a negative side connected to ground and therefore to the third output terminal 204 of the full-wave rectifier bridge 20.

The positive side of the storage battery 40 is also connected to the second output terminal 202 of the full-wave rectifier bridge 20 through a series combination of a starting key switch 50 and an initial excitation resistor 60. The resistor 60 is connected across a charge indication lamp 70.

The operation of the arrangement shown in FIG. 1 will now be described. In order to start the internal combustion engine (not shown), the key switch 50 is closed to permit the storage battery 40 to pass a base current through the now closed switch 50, the parallel combination of the resistor 60 and the indication lamp 70, the emitter-to collector circuit of the control transistor 308 and the base resistor 306 to thereby supply a base current to the output transistor 302 to put the transistor 302 in its conducting state. This causes the storage battery 40 to supply a field current to the field coil 102 of the generator 10 through the components 50, 60, 70 and 308 and the now conducting transistor 302, resulting in the generation of a field magnetomotive force. At that time, a potential difference is developed across the initial excitation resistor 60 to light the charge indication lamp 70. This indicates that the storage battery 40 is not charging.

In this state, the internal combustion engine is started to drive the generator 10. The generator 10 induces an AC output across the armature coil 100 as determined by a speed of rotation thereof. The induced AC output is full-wave rectified by the three-phase full-wave rectifier bridge 20. If a rectified output voltage from the full-wave rectifier bridge 20 is not higher than a predetermined magnitude, then a potential at the junction of the resistors 312 and 314 still remains low enough to maintain the Zener diode 310 in its nonconducting state.

Thus, the output voltage from the generator 10 rises with an increase in speed of rotation of the generator 10.

Thereafter, the generator 10 further increases in speed of rotation until the output voltage therefrom become equal to or higher than the predetermined magnitude. At that time, the potential at the junction of the resistors 312 and 314 is also high enough to cause the Zener diode 310 to conduct. When conducting, the Zener diode 310 causes a base current to flow through the control transistor 308 to put the transistor 308 in its conducting state. The conduction of the transistor 308 puts the transistor 302 in its nonconducting state, resulting in the interruption of the field current flowing through the field coil 102 of the generator 10. Therefore, the output voltage from the generator 10 is decreased. When this output voltage decreases so as to be less than the predetermined magnitude, the Zener diode 310 is again brought into its nonconducting state to put the transistor 308 in its nonconducting state. This causes the transistor 302 to again conduct so as to permit the field coil 102 of the generator 10 to be also energized with the result that the generator 10 again increases in output voltage.

The process as above described is repeated to control the output voltage from the generator 10 to the predetermined magnitude. This controlled voltage is full-wave rectified and then applied to the storage battery 40 to charge the latter to a predetermined voltage.

On the other hand, a rectified voltage developed across the second and third output terminals 202 and 204 of the full-wave rectifier bridge 20 becomes substantially equal to the voltage across the storage battery 40. At that time, the potential difference across the resistor 60 decreases to deenergize the charge indication lamp 70. This indicates that the storage battery 40 is charging.

Figure 2:
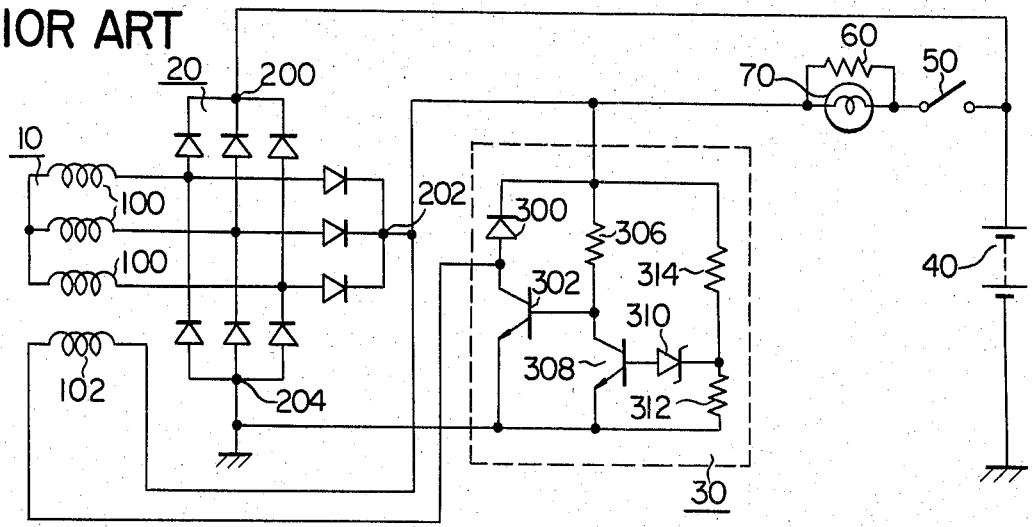
FIG. 2 is a circuit diagram similar to FIG. 1 but illustrating another conventional control device for controlling a battery charging AC generator.

The arrangement illustrated in FIG. 2 is different from that shown in FIG. 1 principally in that in FIG. 2, the field coil 102 of the AC generator 10 has the one end connected to the second output terminal 202 of the full-wave rectifier bridge 20 but not to the third or grounded output terminal 204 thereof. As a result, the transistors 302 and 308 are changed from the PNP to the NPN type and positions thereof are exchanged for those of the diode and base resistor 300 and 306 respectively as compared with the arrangement of FIG. 1.

Therefore, it will readily be understood that the arrangement of FIG. 2 is substantially identical in operation to that shown in FIG. 1.

In each of the arrangement shown in FIGS. 1 and 2, the current through the output transistor 302 has become much higher than a permissible magnitude of the field current through the field coil 102 of the generator 10 upon an interphase shortcircuit occurring in the field coil 102. An interphase shortcircuit may occur in the field coil 102 in operation for various reasons. Also, during the assembly, the person assembling may find the break in the voltage regulator 30 and therefore replace only the broken voltage regulator with a new one without noticing the occurrence of an interphase shortcircuit in the field coil 102. Alternatively, a shortcircuit may occur in the electric leads connected to the field coil 102 resulting in an interphase shortcircuit of the latter. Under these circumstances, a current flowing through the output transistor 302 becomes much greater than the permissible magnitude of the field current and therefore, the collector-to-emitter voltage thereof is also correspondingly high. Thus, the transistor 302 has an increased power loss.

This inevitably results in an instantaneous breakdown of the output transistor 302 and accordingly, the reliability of the device is decreased.

The present invention is directed to the elimination of the disadvantages of the prior art as described above.

Figure 3:
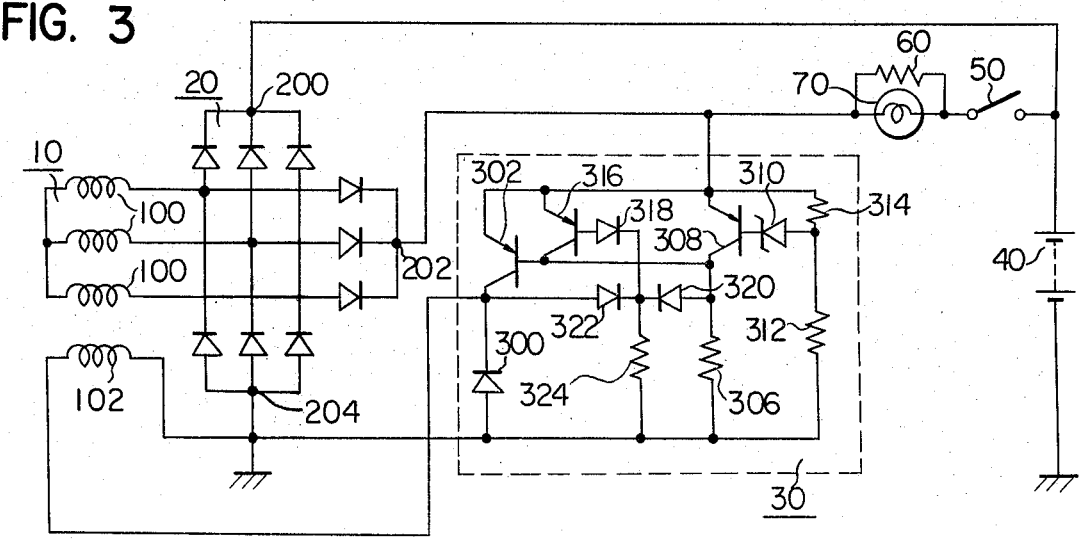
FIG. 3 is a circuit diagram of a control device for controlling a battery charging AC generator constructed in accordance with the principles of the present invention.

Referring now to FIG. 3, there is illustrated one embodiment according to the control device for a battery charging AC generator of the present invention. The arrangement illustrated is different from that shown in FIG. 1 in that in FIG. 3, there is provided a PNP current limiting transistor 316 having an emitter electrode which is connected to the emitter output transistor 302, a collector electrode connected to the base electrode of the transistor 302 and a base circuit having a semiconductor bias diode 318 forwardly connected therein. That is, the bias diode 318 includes an anode electrode connected to a base electrode of the transistor 316 and a cathode electrode connected to cathode electrodes of a pair of first and second semiconductor sensor diodes 320 and 322 interconnected back to back and also connected to the grounded output terminal 204 of the full-wave rectifier bridge 20 through a base resistor 324. The first diode 320 includes an anode electrode connected to the collector electrode of the current limiting transistor 316 to sense the collector voltage thereof while the second diode 322 includes an anode electrode connected to the collector electrode of the output transistor 302 to sense the collector voltage thereof.

The operation of the arrangement shown in FIG. 3 will now be described. Assuming that a fault such as an interphase shortcircuit or the like does not occur in the field coil 102, the starting key switch 50 is closed to start an internal combustion engine (not shown). This results in the generation of a magnetomotive force on the field coil 102 in the same manner as above described in conjunction with FIG. 1.

At that time, the output transistor 302 is in its conducting state so that a collector-to-emitter voltage thereof is lower than the sum of a base-to-emitter voltage of the current limiting transistor 316 and a forward voltage drop across the bias diode 318. Therefore, the current limiting transistor 316 is in its nonconducting state.

Then, the internal combustion engine (not shown) is started to drive the AC generator 10. Under these circumstances, and upon the rectified output voltage from the AC generator 10 exceeding a predetermined magnitude set for the voltage regulator 30, the Zener diode 310 and the control transistor 308 are conducting to place the output transistor 302 in its nonconducting state to thereby decrease the output voltage from the generator 10 as in the arrangement of FIG. 1. At that time, the control transistor 308 is also in its conducting state so that the collector-to-emitter voltage thereof is lower than the sum of the base-to-emitter voltage of the current limiting transistor 316 and the forward voltage drop across the bias diode 318. Thus, the current limiting transistor 316 is similarly in its nonconducting state.

As a result, the arrangement is operated in the same manner as that shown in FIG. 1 to charge the storage battery 40 to a predetermined voltage from the generator 10.

However, in the event of an interphase shortcircuit in the coil 102, when the key switch 50 has been only closed and the internal combustion engine (not shown) is stopped, the collector current flowing through the output transistor 302 is abruptly increased. Under these described conditions, the base current flowing through the output transistor 302 has a magnitude which is determined by the base resistor 306. Accordingly, the output transistor 302 has an amplification degree which is low enough to render the collector-to-emitter voltage thereof not lower than the sum of the base-to-emitter voltage of the current limiting transistor 316 and the forward voltage drop across the bias diode 318.

Simultaneously, no output voltage is generated, at that time, across the AC generator 10 because the engine is stopped. This causes the Zener diode 310 and the control transistor 308 to be maintained in their nonconducting state so that the base current from the battery 40 flows through the current limiting transistor 316 through the closed key switch 50, the parallel combination of resistor 60 and the lamp 70, the emitter-to-base circuit of the transistor 316, the bias diode 318 and the resistor 324 to place the transistor 316 in its conducting state. Therefore, the output transistor 302 is acted upon by transistor 316 and is caused to not conduct with the result that the transistor 302 can be prevented from breaking down due to a flow of very high collector current therethrough.

Figure 4:
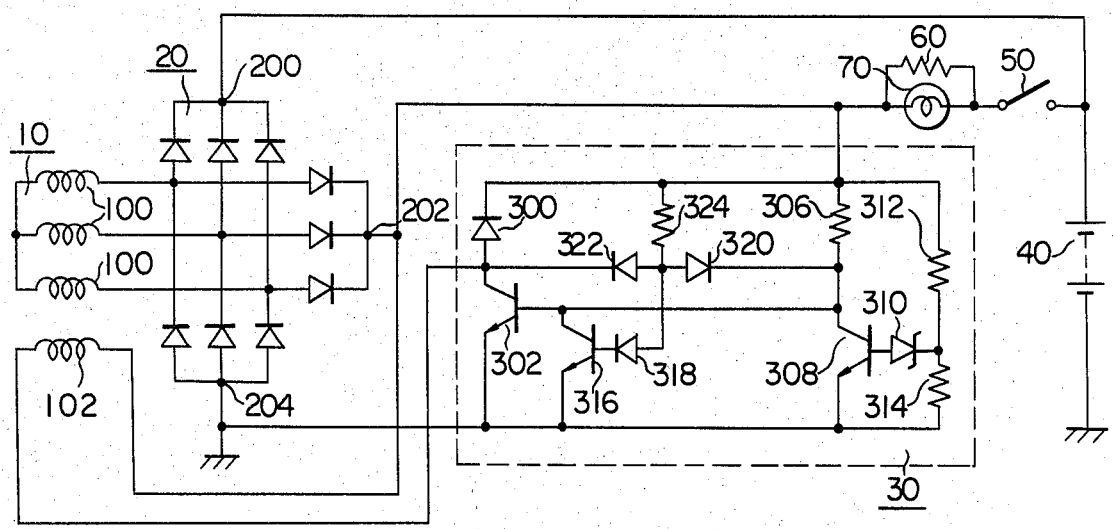
FIG. 4 is a view similar to FIG. 3 but illustrating a modification of the present invention.

The arrangement illustrated in FIG. 4 is different from that shown in FIG. 2 only in that in FIG. 4, an NPN current limiting NPN transistor 316, the bias diode 318, and the sensor diodes 320 and 322 are interconnected operatively associated with the NPN output transistor 302 in the same manner as shown in FIG. 3 excepting that the emitter electrode of the transistor 316 and the base resistor 324 are connected to the third and second output terminals 204 and 202 of the full-wave rectifier bridge 20 respectively.

The arrangement is substantially similar in both operation and results to that shown in FIG. 3.

Figure 5:
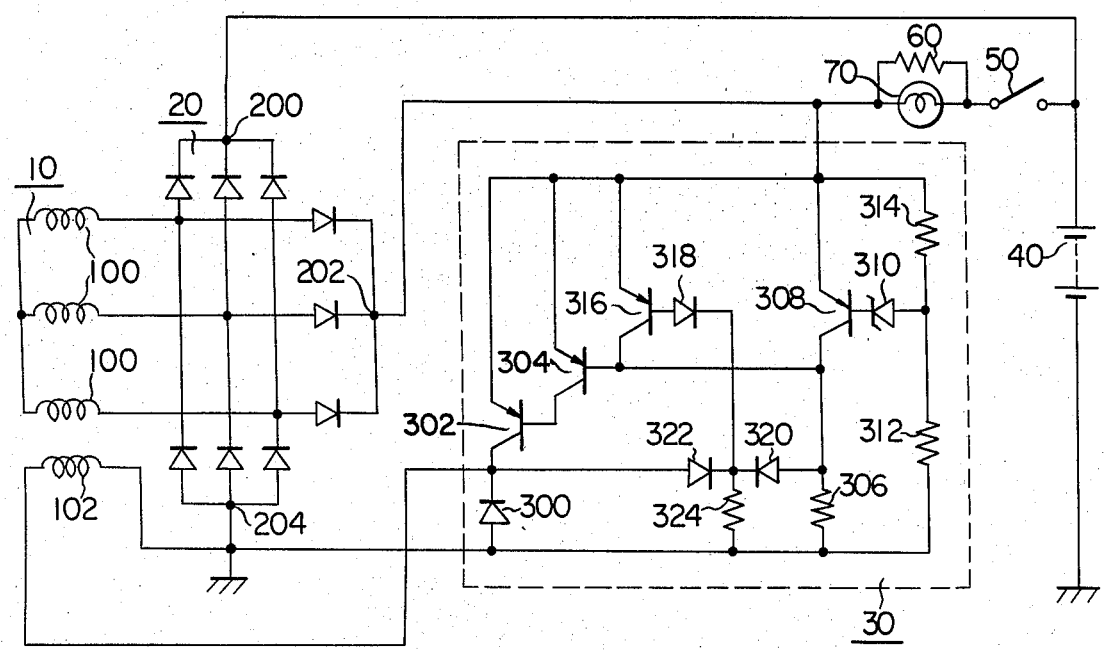
FIG. 5 is a view similar to FIG. 3 and illustrating a modification of the arrangement shown in FIG. 3.

The arrangement illustrated in FIG. 5 is different from that shown in FIG. 3 only in that in FIG. 5, the PNP output transistor 302 is connected to a PNP driving transistor 304 to form a Darlington circuit configuration.

Figure 6:
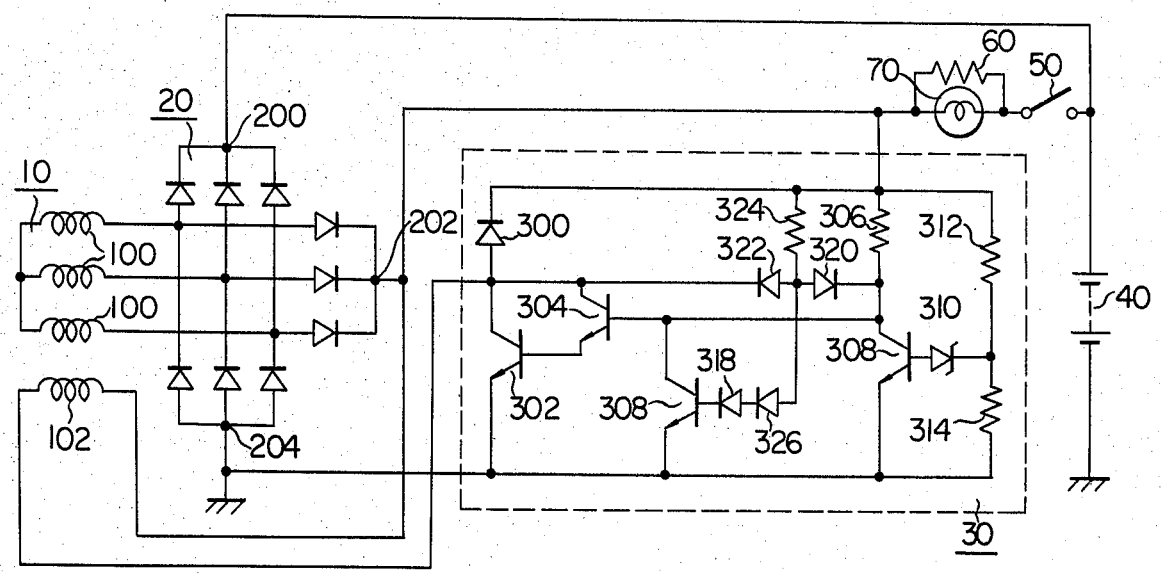
FIG. 6 is a view similar to FIG. 3 but illustrating a modification of the arrangement shown in FIG. 4.

The arrangement illustrated in FIG. 6 is different from that shown in FIG. 4 in that the NPN output transistor 302 is connected to an NPN driving transistor 304 to form a Darlington circuit configuration. When conducting, both transistors 302 and 304 increase in collector-to-emitter voltage. This increase in voltage is compensated for by another bias diode 326 which is serially connected to the bias diode 318 with the same polarity.

While the present invention has been illustrated and described in conjunction with a few preferred embodiments thereof it is to be understood that numerous changes and modifications may be resorted to without departing from the spirit and scope of the present invention.

What is claimed is:

1. A control device for controlling a battery charging AC generator including a field coil and having a full-wave rectifier means connected thereto for rectifying an AC output voltage from said AC generator and having a storage battery connected to said full-wave rectifier means for being charged therefrom;

said control device comprising:

a voltage regulating means connected to said battery and through said full-wave rectifying means to said AC generator for controlling said output from said AC generator to be below a predetermined magnitude, said voltage regulating means comprising: an output transistor serially connected to said field coil for causing a field current to flow therethrough for controlling said output voltage from said AC generator, a control transistor connected through said full-wave rectifying means to said AC generator and connected to said output transistor for controlling the conduction state of said output transistor, a diode-resistor network means connected to said field coil and connected to the collectors of said output transistor and said control transistor for providing an output when a high voltage above said predetermined magnitude occurs from an interlayer short-circuit in said field coil, and a current limiting transistor connected to said output transistor and said diode-resistor network means and said control transistor and having a base current supplied thereby by said output of said diode-resistor network means when the collector-to-emitter voltages of said output and control transistors reach said predetermined magnitude, wherein said current limiting transistor conducts, thereby causing said output transistor to not conduct.

2. A control device for controlling a battery charging AC generator as claimed in claim 1, wherein one end of said field coil which is remotely located from said output transistor is connected to said storage battery on the negative side of said battery and wherein all of said transistors are of the PNP type.

3. A control device for controlling a battery charging AC generator as claimed in claim 2, wherein collector electrodes of said control and current limiting transistors are both connected to a base electrode of said output transistor, and wherein said current limiting transistor has a diode forwardly connected in series with its base electrode, and wherein emitter electrodes of said control and current limiting transistors are both connected to an emitter electrode of said output transistor.

4. A control device for controlling a battery charging AC generator as claimed in claim 1, wherein one end of said field coil which is remotely located from said output transistor is connected to said storage battery on the positive side of said battery and wherein all of said transistors are of the NPN type.

5. A control device for controlling a battery charging AC generator as claimed in claim 4, wherein collector electrodes of said control and current limiting transistors are both connected to a base electrode of said output transistor, and wherein said current limiting transistor has a diode forwardly connected in series with its base electrode, and wherein emitter electrodes of said control and current limiting transistors are both connected to an emitter electrode of said output transistor.

6. A control device for charging a battery charging AC generator as claimed in claim 1, further comprising a driving transistor connected between said control transistor and said output transistor and being controlled by said control transistor, whereby said control transistor controls the conduction state of said output transistor through said driving transistor.

7. A control device for controlling a battery charging AC generator as claimed in claim 1, wherein said output transistor has its base electrode connected to collector electrodes of said control and current limiting transistors, said control transistor has a diode forwardly connected in series with its base electrode, and said output transistor has one of either its collector electrode and emitter electrode connected to emitter electrodes of said control and current limiting transistors, the other electrode of either said collector electrode and emitter electrode of said output transistor and the collector electrode of said control transistor respectively have forwardly connected diodes in series therewith, said three diodes connected together such that, when a collector-to-emitter voltage of said output transistor reaches the sum of a base-to-emitter voltage of said current limiting transistor and a forward voltage drop across said diode in series with said base of said control transistor, said current limiting transistor conducts so as to open said output transistor.

8. A control device for controlling a battery charging AC generator including a field coil and having a full-wave rectifier means connected thereto for rectifying an AC output voltage from said AC generator and having a storage battery connected to said full-wave rectifier means for being charged therefrom;

said control device comprising:
a voltage regulating means connected to said battery and through said full-wave rectifying means to said AC generator for controlling said output from said AC generator to be below a predetermined magnitude, said voltage regulating means comprising: an output transistor serially connected to said field coil to cause a field current to flow therethrough for controlling said output voltage from said AC generator, a control transistor connected through said full-wave rectifying means to said AC generator and connected to said output transistor for controlling the conduction state of said output transistor, and a current limiting transistor connected to said output transistor for sensing the collector-to-emitter voltage of said output transistor wherein when said control transistor is nonconducting, said output transistor's collector-to-emitter voltage reaches a specified maximum and said current limiting transistor conducts, thereby causing said output transistor to not conduct;
wherein one end of said field coil which is remotely located from said output transistor is connected to said storage battery on the negative side of said battery and wherein all of said transistors are of the PNP type;
and wherein collector electrodes of said control and current limiting transistors are both connected to a base electrode of said output transistor, and wherein said current limiting transistor has a diode connected in series with its base electrode, and wherein emitter electrodes of said control and current limiting transistors are both connected to an emitter electrode of said output transistor.

9. A control device for controlling a battery charging AC generator including a field coil and having a full-wave rectifier means connected thereto for rectifying an AC output voltage from said AC generator and having a storage battery connected to said full-wave rectifier means for being charged therefrom;

said control device comprising:
a voltage regulating means connected to said battery and through said full-wave rectifying means to said AC generator for controlling said output from said AC generator to be below a predetermined magnitude, said voltage regulating means comprising: an output transistor serially connected to said field coil to cause a field current to flow therethrough for controlling said output voltage from said AC generator, a control transistor connected through said full-wave rectifying means to said AC generator and connected to said output transistor for controlling the conduction state of said output transistor, and a current limiting transistor connected to said output transistor for sensing the collector-to emitter voltage of said output transistor wherein when said control transistor is nonconducting, said output transistor's collector-to-emitter voltage reaches a specified maximum and said current limiting transistor conducts, thereby causing said output transistor to not conduct;

wherein one end of said field coil which is remotely located from said output transistor is connected to said storage battery on the positive side of said battery and wherein all of said transistors are of the NPN type;

and wherein collector electrodes of said control and current limiting transistors are both connected to a base electrode of said output transistor, and wherein said current limiting transistor has a diode forwardly connected in series with this base electrode, and wherein emitter electrodes of said control and current limiting transistors are both connected to an emitter electrode of said output transistor.

10. A control device for controlling a battery charging AC generator including a field coil and having a full-wave rectifier means connected thereto for rectifying an AC output voltage from said AC generator and having a storage battery connected to said full-wave rectifier means for being charged therefrom;

said control device comprising:

a voltage regulating means connected to said battery and through said full-wave rectifying means to said AC generator for controlling said output from said AC generator to be below a predetermined magnitude, said voltage regulating means comprising: an output transistor serially connected to said field coil to cause a field current to flow therethrough for controlling said output voltage from said AC generator, a control transistor connected through said full-wave rectifying means to said AC generator and connected to said output transistor for controlling the conduction state of said output transistor, and a current limiting transistor connected to said output transistor for sensing the collector-to-emitter voltage of said output transistor wherein when said control transistor is nonconducting, said output transistor's collector-to-emitter voltage reaches a specified maximum and said current limiting transistor conducts, thereby causing said output transistor to not conduct;

wherein said output transistor has its base electrode connected to collector electrodes of said control and current limiting transistors, said control transistor has a diode forwardly connected in series with this base electrode, and said output transistor has one of either its collector electrode and emitter electrode connected to emitter electrodes of said control and current limiting transistors, the other electrode of said collector electrode and emitter electrode of said output transistor and the collector electrode of said control transistor respectively have forwardly connected diodes in series therewith, said three diodes connected together such that, when a collector-to-emitter voltage of said output transistor reaches the sum of a base-to-emitter voltage of said current limiting transistor and a forward voltage drop across said diode in series with said base of said control transistor, said current limiting transistor conducts so as to open said output transistor.

* * * * *